United States Patent
Wendling

(10) Patent No.: US 10,015,563 B2
(45) Date of Patent: *Jul. 3, 2018

(54) METHOD FOR BUILDING AND TRANSMITTING A WATERMARKED CONTENT, AND METHOD FOR DETECTING A WATERMARK OF SAID CONTENT

(71) Applicant: NAGRAVISION S.A., Cheseaux-sur-Lausanne (CH)

(72) Inventor: Bertrand Wendling, Divonne-les-Bains (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,727

(22) Filed: Nov. 16, 2015

(65) Prior Publication Data
US 2016/0073177 A1    Mar. 10, 2016

Related U.S. Application Data

(63) Continuation of application No. 13/948,527, filed on Jul. 23, 2013, now Pat. No. 9,294,824.
(Continued)

(30) Foreign Application Priority Data

Jul. 24, 2012 (EP) ..................................... 12177576

(51) Int. Cl.
G06F 21/00        (2013.01)
H04N 21/8358    (2011.01)
(Continued)

(52) U.S. Cl.
CPC ......... *H04N 21/8358* (2013.01); *G06F 21/16* (2013.01); *H04N 21/23892* (2013.01); *H04N 21/25875* (2013.01); *G06F 2221/0737* (2013.01)

(58) Field of Classification Search
CPC ....................... G06F 3/1243; H04L 2012/5682
See application file for complete search history.

(56) References Cited

U.S. PATENT DOCUMENTS 6,282,330 B1    8/2001  Yokota et al.
6,298,088 B1   10/2001  Bhatt et al.
(Continued)

FOREIGN PATENT DOCUMENTS

CA    2681128    9/2008
CN    1290441    4/1941
(Continued)

OTHER PUBLICATIONS

European Search Report issued in EP 11 17 4431, dated Apr. 25, 2013.
(Continued)

*Primary Examiner* — Josnel Jeudy
(74) *Attorney, Agent, or Firm* — DLA Piper LLP (US)

(57) ABSTRACT

The present invention concerns a method for building a watermarked content for sending to at least one user unit having a user unit identifier, the watermarked content comprising a first series of packets, at least some from the first series of packets being available in at least two different qualities, wherein said method comprises the steps of:
  generating a watermark based on at least the user unit identifier, the watermark being formed by a first series of values from a predetermined set of values;
  mapping each of the at least two different qualities to one from the predetermined set of values;
(Continued)

building the watermarked content by sequentially selecting from the first series of packets, a packet having a quality corresponding to each value from the first series of values forming the watermark.

It further concerns a method for transmitting such a watermarked content.

21 Claims, 2 Drawing Sheets

Related U.S. Application Data

(60) Provisional application No. 61/674,869, filed on Jul. 24, 2012.

(51) Int. Cl.
  *H04N 21/2389* (2011.01)
  *H04N 21/258* (2011.01)
  *G06F 21/16* (2013.01)

(56) References Cited

U.S. PATENT DOCUMENTS

| | | | |
|---|---|---|---|
| 6,724,914 | B2 | 4/2004 | Brundage et al. |
| 7,406,598 | B2 | 7/2008 | Ducharme |
| 7,613,691 | B2 | 11/2009 | Finch |
| 7,653,940 | B2 | 1/2010 | Luo et al. |
| 7,694,318 | B2 | 4/2010 | Konig et al. |
| 7,698,350 | B2 | 4/2010 | Kii |
| 7,738,704 | B2 | 6/2010 | Lienhart et al. |
| 7,970,164 | B2 | 6/2011 | Nakamura et al. |
| 7,984,089 | B2 | 7/2011 | Gates et al. |
| 8,086,171 | B2 | 12/2011 | Wang et al. |
| 8,126,202 | B2 | 2/2012 | Nakamura et al. |
| 8,166,302 | B1 | 4/2012 | Shih |
| 8,395,822 | B2 | 3/2013 | Guo et al. |
| 8,667,552 | B2 | 3/2014 | Subramanian et al. |
| 9,100,564 | B2 | 8/2015 | Hinkel |
| 2002/0007403 | A1 | 1/2002 | Echizen |
| 2002/0172395 | A1 | 11/2002 | Foote et al. |
| 2003/0009669 | A1 | 1/2003 | White et al. |
| 2003/0072467 | A1 | 4/2003 | Brundage et al. |
| 2003/0163684 | A1 | 8/2003 | Fransdonk |
| 2003/0185417 | A1 | 10/2003 | Alattar |
| 2005/0015816 | A1 | 1/2005 | Christofalo et al. |
| 2005/0036653 | A1 | 2/2005 | Brundage et al. |
| 2005/0044561 | A1 | 2/2005 | McDonald |
| 2005/0102236 | A1 | 5/2005 | Wary |
| 2005/0149968 | A1 | 7/2005 | Konig et al. |
| 2005/0262352 | A1 | 11/2005 | Kessler et al. |
| 2006/0048237 | A1 | 3/2006 | Luo et al. |
| 2006/0120562 | A1 | 6/2006 | Fudge et al. |
| 2006/0187358 | A1 | 8/2006 | Lienhart et al. |
| 2006/0190776 | A1 | 8/2006 | Oostveen et al. |
| 2006/0253330 | A1 | 11/2006 | Maggio et al. |
| 2006/0257000 | A1 | 11/2006 | Boyce et al. |
| 2006/0282847 | A1 | 12/2006 | Gupte |
| 2007/0094583 | A1 | 4/2007 | Randall et al. |
| 2007/0286454 | A1 | 12/2007 | Brundage et al. |
| 2008/0010653 | A1 | 1/2008 | Ollikainen et al. |
| 2008/0069464 | A1 | 3/2008 | Nakayama |
| 2008/0089552 | A1 | 4/2008 | Nakamura et al. |
| 2008/0098464 | A1 | 4/2008 | Mizrah |
| 2008/0168489 | A1 | 7/2008 | Schraga |
| 2009/0049491 | A1 | 2/2009 | Karonen et al. |
| 2009/0216872 | A1 | 8/2009 | Albig et al. |
| 2009/0217049 | A1 | 8/2009 | Seehaweru |
| 2009/0323822 | A1 | 12/2009 | Rodriguez et al. |
| 2010/0034389 | A1 | 2/2010 | Sakharov |
| 2010/0046606 | A1 | 2/2010 | Celik et al. |
| 2010/0115616 | A1 | 5/2010 | Jogand-Coulomb |
| 2010/0172539 | A1 | 7/2010 | Sugimoto |
| 2010/0195488 | A1 | 8/2010 | Mehrotra |
| 2010/0251352 | A1 | 9/2010 | Zarchy |
| 2010/0269128 | A1 | 10/2010 | Gordon |
| 2010/0290667 | A1 | 11/2010 | Lienhart et al. |
| 2011/0058188 | A1 | 3/2011 | Guo et al. |
| 2011/0069861 | A1 | 3/2011 | Brundage et al. |
| 2011/0149145 | A1 | 6/2011 | Ramos et al. |
| 2011/0228972 | A1 | 9/2011 | Nakamura et al. |
| 2011/0255840 | A1 | 10/2011 | Bornsen |
| 2011/0268428 | A1 | 11/2011 | Chen et al. |
| 2012/0016876 | A1 | 1/2012 | Oostveen et al. |
| 2012/0045054 | A1 | 2/2012 | Main et al. |
| 2012/0063636 | A1 | 3/2012 | Lienhart et al. |
| 2013/0054972 | A1 | 2/2013 | Thorwirth |
| 2013/0156397 | A1 | 6/2013 | Chen et al. |
| 2013/0276033 | A1 | 10/2013 | Francini et al. |
| 2014/0068260 | A1 | 3/2014 | Oney |

FOREIGN PATENT DOCUMENTS

| | | |
|---|---|---|
| CN | 1694528 | 11/2005 |
| CN | 1741442 | 3/2006 |
| DE | 10 2004 056336 | 5/2006 |
| EP | 1009126 | 6/2000 |
| EP | 2 270 742 | 1/2011 |
| FR | 2 858 733 | 2/2005 |
| TW | 201110701 | 3/2011 |
| TW | 201203188 | 1/2012 |
| WO | WO 00/35144 | 6/2000 |
| WO | WO 01/28230 | 4/2001 |
| WO | WO 03/063445 | 7/2003 |
| WO | WO 2004/040913 | 5/2004 |
| WO | WO 2007/065719 | 6/2007 |
| WO | WO 2007/090795 | 8/2007 |
| WO | WO 2009/032214 | 3/2009 |
| WO | WO 2010/051436 | 5/2010 |
| WO | WO 2011/032167 | 3/2011 |

OTHER PUBLICATIONS

M.D. Walker et al., "Mobile Video-Streaming", BT Technology Journal, vol. 21, No. 3, pp. 192-202, Jul. 2003.
Amos Fiat et al., "Dynamic Traitor Tracing", J. Cryptology, vol. 14, pp. 211-223 (2001).
English language abstract of FR 2 858 733, published Feb. 11, 2005.
English language abstract of DE 10 2004 056336, published May 24, 2006.
International Search Report issued in International Application No. PCT/IB2012/051968, dated Aug. 2, 2012.
Written Opinion issued in International Application No. PCT/IB2012/051968, dated Aug. 2, 2012.
Chi-Hung Chi et al., "Automatic Proxy-Based Watermakring for WWW", Computer Communications, vol. 24, No. 2, pp. 144-154, Feb. 1, 2001.
Search Report issued in EP 12 18 5786, dated Feb. 8, 2013.
Partial European Search Report issued in EP 12 17 7576 dated Dec. 21, 2012.
P.Y. Liew et al., "Inaudible Watermakring Via Phase Manipulation of Random Frequencies", Multimed Tools Appl., vol. 35, pp. 357-377 (2007).
Anand S. Nair et al., "Length Based Network Steganography Using UDP Protocol", IEEE Thrid International Confernece on Communication Software and Networks, pp. 726-730, May 27, 2011.
Mohamed F. Mansour et al., "Audio Watermarking by Time-Scale Modification", 2001 IEEE International Conference on Acoustics, Speech, and Signal Processing, pp. 1353-1356. May 7, 2001.
European Search Report issued in EP 13 17 5253 dated Apr. 1, 2014.
Image File History of U.S. Appl. No. 13/948,527.
U.S. Appl. No. 13/187,194, US 2012-0045054, Feb. 23, 2012, Pending.
U.S. Appl. No. 13/948,527, US 2014-0032918, Jan. 30, 2014, Pending
U.S. Appl. No. 14/036,678, US 2014-0115626, Apr. 24, 2014, Pending.
U.S. Appl. No. 14/112,450, US 2014-0040623, Oct. 17, 2013, Pending.

(56) References Cited

OTHER PUBLICATIONS

U.S. Appl. No. 14/942,727, US 2016-0073177, Mar. 10, 2016, Pending.
Search Report issued in Taiwanese Application No. 102125937 dated Jun. 22, 2016.
English language abstract of TW 20111701 published Mar. 16, 2011.
English language abstract of TW 201203188 published Jan. 16, 2012.
Chinese Office Action issued in CN 201280019398.2 dated Aug. 10, 2016, with English language translation.
English language abstract of CN 1694528A dated Nov. 9, 2005.
English language abstract of CN 1741442A dated Mar. 1, 2006.
English language abstract of CN 1290441A dated Apr. 4, 2001.
Image File History of U.S. Appl. No. 13/187,194.
Image File History of U.S. Appl. No. 14/112,450.
Image File History of U.S. Appl. No. 14/036,678
Image File History of U.S. Appl. No. 14/036,678.
Image File History of U.S. Appl. No. 15/643,128.
U.S. Appl. No. 13/948,527, US 2014-0032918, Jan. 30, 2014, Abandoned.
U.S. Appl. No. 14/036,678, US 2014-0115626, Apr. 24, 2014, Abandoned.
U.S. Appl. No. 15/643,128, filed Jul. 6, 2017, Pending.

METHOD FOR BUILDING AND TRANSMITTING A WATERMARKED CONTENT, AND METHOD FOR DETECTING A WATERMARK OF SAID CONTENT

CROSS REFERENCE TO RELATED APPLICATIONS

This application is a continuation of U.S. patent application Ser. No. 13/948,527 filed Jul. 23, 2013, which claims priority under 35 U.S.C. Section. 119 to the U.S. provisional Application No. 61/674,869 and to the European patent application No. EP12177576.1, entitled "METHOD FOR MARKING AND TRANSMITTING A CONTENT AND METHOD FOR DETECTING AN IDENTIFIER OF SAID CONTENT" filed Jul. 24, 2012, the contents of which are hereby incorporated by reference herein.

TECHNICAL FIELD

The present invention concerns a method for building a watermarked content for sending to at least one user unit having a user unit identifier, the watermarked content comprising a first series of packets, at least some from the first series of packets being available in at least two different qualities.

The invention further concerns a method for transmitting a watermarked content from a content provider to at least one user unit having a user unit identifier, the watermarked content comprising a first series of packets, at least some from the first series of packets being available in at least two different qualities, The method also concerns a method for detecting a watermark of a content built or transmitted according to the method of the invention.

BACKGROUND ART

Presently, when an audio/video stream or other content such as pay-TV content or similar are delivered to a user by a provider, the content provider may be willing to watermark this content in a way that is unique for each user. Thus, if the content has been illegally redistributed, the provider may find the source of this illegal distribution.

Usually, a watermark is applied to the content itself, the watermark being formed by an invisible/inaudible modification of the video and/or audio stream. For unicast streams, it is possible to apply the watermark at the head-end or at the reception device. At the head-end, applying a watermark requires modifying the stream for each user. This solution requires a lot of resources and is quite difficult to implement.

If the watermark is applied at the reception, the user units must be secure devices, which is usually not the case if the user unit is a computer type receiver. Moreover, applying the watermark at the reception is a heavy processing.

Thus, there is a need for a method enabling applying a watermark to a content, which is compatible with a unicast stream.

The publication of P. Y. Liew and M. A. Armand, entitled "Inaudible watermarking via phase manipulation of random frequencies", "MULTIMEDIA TOOLS APPL." vol. 35, no 3, 6 Jun. 2007, XP019555269, pages 357-377 describes a method for watermarking an audio content in a robust and inaudible way. This method exploits the fact that the human auditory system is not sensitive to absolute phase of a signal. Thus, the human auditory system is unable to discern any audible difference between two signals of the same frequency, but for example 60° out of phase when both are heard separately.

The method described in this document comprises the following steps.

1. Generate, via a pseudorandom generator, 300 random numbers between 0 and 0.5.
2. Multiply each number generated by $44.1 \times 10^3$ to yield a frequency value between 0 and 22.05 kHz.
3. Sort the corresponding 300 frequency components of the audio segment in terms of their amplitudes.
4. Identify 200 frequency values corresponding to the frequency components of smallest amplitude. Then, without changing the order in which they were generated, partition them into two groups of equal cardinality with the first 100 frequency values contained in the first group.
5. To insert watermark bit 0, the phase values of the frequency components of the audio segment corresponding to the first and second groups are set to $-2\pi/3$ and $2\pi/3$ rad, respectively. To insert watermark bit 1, the phase values of the frequency components of the audio segment corresponding to the first and second groups have their phase values set to $2\pi/3$ and $-2\pi/3$ rad, respectively.

This method differs from the method of the present invention at least by the fact that the method of the present invention does not rely on several signal being out of phase.

The document above contains a short description of several methods enabling adding a watermark to an audio content. According to one of those methods, referred to as "Time base modulation", the audio signal is first subdivided into segments. Each segment is then expanded or compressed depending on the value of a watermark bit for this segment.

To retrieve the watermark, the watermarked sequence is compared to the original to detect the deviations resulting from the various sequences of expansions and compressions.

This method requires the comparison between the original signal and the watermarked signal in order to retrieve the watermark as, whatever the watermark is, the quantity of information within one packet remains unchanged. Moreover, the watermark may be audible if the expansions or compressions changes are too great.

The publication entitled "Length based network steganography using UDP protocol" from Anand S Nair, Abhishek Kumar, Arijit Sur and Sukumar Nandi, 3RD INTERNATIONAL CONFERENCE ON IEEE, 27 May 2011, pages 726-730, XP032050871, ISBN: 978-1-61284-485-5 discloses a steganographic algorithm for hiding secret data within packets of content. The length of the packets is modulated in order to correspond to the secret data to be transmitted. The algorithm described in this document enables imitating the length distribution of conventional packets, i.e. packets without steganographic data, in order to prevent users from guessing that secret data is added to the data flow.

In this document, the key is the use of steganography. This means that data is hidden within the packets. If an ill-intentioned person learns that secret data is hidden within the data, this data can be easily eliminated and even possibly read. Moreover, the secret data is very sensitive to re-sampling.

DISCLOSURE OF THE INVENTION

The object of the invention is to solve the problem of providing a method enabling to watermark a content in a way which is unique for a user unit or at least for a group of user units. This watermarking is not detected by the user and does not modify the quality or the speed of transmission of the transmitted data. Moreover, even if an ill-intentioned user detects or knows that a watermark is embedded in the transmitted data, he/she can only remove this watermark at the cost of a loss of quality. In case a content is found for example on an unauthorized site, the source of the content can be tracked by reading the watermark.

The object of the invention is achieved by a method for watermarking a content such as defined in the preamble and characterized in that said method comprises the steps of:

generating a watermark based on at least the user unit identifier, the watermark being formed by a first series of values from a predetermined set of values;

mapping each of the at least two different qualities to one from the predetermined set of values;

building the watermarked content by sequentially selecting from the first series of packets, a packet having a quality corresponding to each value from the first series of values forming the watermark.

The object of the invention is further achieved by a method for transmitting a watermarked content such as defined in the preamble and characterized in that said method comprises the steps of:

generating a watermark based on at least on the user unit identifier, the watermark being formed by a first series of values from a predetermined set of values;

mapping each of the at least two different qualities to one from the predetermined set of values;

building the watermarked content by sequentially selecting from the first series of packets, a packet having a quality corresponding to each value from the first series of values forming the watermark;

transmitting said packets to said at least one user unit.

The object of the invention is also achieved by a method for detecting a watermark of a content watermarked according to the method described above, characterized in that it comprises the steps of:

determining a quality of packets forming said watermarked content;

associating a value to the packets of the watermarked content, said value being determined according to a predetermined rule; and calculating the watermark from the series of values associated to the packets forming the content.

According to the invention, the method enables defining an identifier that may be unique for each user unit or for a given set of user units, for example for all the user units of the same user. This identifier is defined by using chunks or packets of data having specific characteristics, and by mapping the specific characteristics with a value corresponding to the identifier. These characteristics are detectable even if the packets are resent from one user unit to another. The characteristic used in the method of the invention is the quality of the packets, or in other words, the bit rate at which the data have been encoded.

The different qualities correspond to different values. The watermark is formed of a set of values which is specific for each user unit or group of user units. Thus, if a content is analyzed, it is possible to determine the quality of each packet. The quality of each packet is associated with a value according to a set of rules, a set of analyzed packets corresponding to a set of values. The set of values gives a code or watermark which can be associated with a specific user unit or a specific user.

According to this method, there is no need for comparing the watermarked signal with the original signal to retrieve the watermark. The watermark contains by itself, the information that is requested to form this watermark. The quantity of information within one packet depends on the value of the watermark. This quantity of information can be measured and can be used to determine the value of the watermark without requiring a comparison with the original signal.

BRIEF DESCRIPTION OF DRAWINGS

The present invention and its advantages will be better understood thanks to the enclosed drawings and to the detailed description of different embodiments, in which

FIG. 1b shows a watermark transmitted according to the method of the invention and with the values of FIG. 1a;

FIG. 2b shows a watermark sent according to the embodiment of FIG. 2a;

FIG. 3b illustrates a watermark transmitted according to the embodiment of FIG. 3a;

FIG. 4b shows a watermark sent according to the embodiment illustrated by FIG. 4a;

FIG. 6b illustrates a second value associated with a set of packets, according to the variant of FIG. 6a.

MODES FOR CARRYING OUT THE INVENTION

As it is well known from the man skilled in the art, prior to sending audio/video data to user units, the content is separated in packets or chunks and processed to lower the size of the data to be transmitted. Usually, this processing or encoding used in the field of the pay-TV for lowering the size of the data are lossy data compression algorithms. This means that some loss of information occurs. There is a trade-off between information loss and the reduction in size. The information loss can be used as a definition of the quality or resolution of a content or of a packet. A high resolution or high quality data packet means that the loss of information is low and that the packet has a large size. Conversely, a low resolution or low quality data packet has a smaller size, but the loss of information is greater. The compression rate can also be used to define the quality or resolution of a packet. A high compression rate leads to a small sized packet and to a low quality. A lower compression rate leads to a packet having a larger size and a better quality or resolution.

The bit rate or bandwidth is the quantity of information or number of bits that are transmitted per unit of time. With a high bit rate or a high bandwidth, a great number of packets can be transmitted per unit of time, or packets having a great size can be transmitted per unit of time. Consequently, high quality content can be transmitted in case of great bandwidth, while lower quality content can be transmitted in case of lower bandwidth.

It should be noted that the quality of a transmitted packet remains unchanged at the receiver reception's side, which means that this quality can be detected even after the content is redistributed.

Figure 1A:
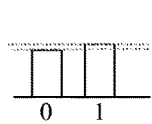
FIG. 1a is a schematic representation of values associated with packets of data with different qualities.

In FIG. 1a, two data packets are represented. One of these packets, illustrated on the left hand side, corresponds to a first quality and is associated with a first value, for example 0. The other packet corresponds to another quality and is associated with another value, for example 1.

Figure 1B:
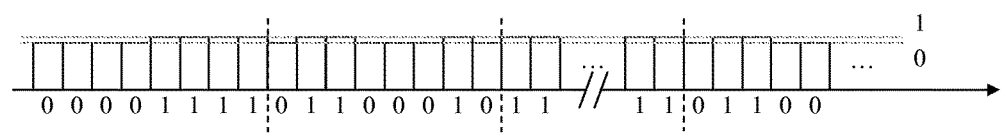

FIG. 1b illustrates an identifier or watermark that is associated with a content and sent according to the method of the invention. The first set of 8 values corresponds to a synchronisation pattern. This synchronisation pattern is useful to detect the beginning of the transmission of packets from which the watermark may be detected. In the examples illustrated, the synchronisation pattern comprises four zeros, followed by four ones. After the synchronisation pattern, the qualities of subsequent packets correspond to the values forming the watermark. In the examples of FIGS. 1b, 2b and 3b, the watermark is {01100010}. Of course, the number of bits of this watermark determines the maximal number of codes that it is possible to build. In practice, the number of bits will usually be greater than eight. It should be noted that the detection of the packets corresponding to the watermark could be made not by a synchronisation pattern but for example by a header contained in a packet. In the case of a header, when the packets are received by a user unit, the content of the packets is read. One packet can contain a specific header implying that this packet is considered as indicating the beginning of the watermark. The synchronisation pattern or the header could be sent immediately before the transmission of the packet corresponding to the watermark. However, it is also possible to send the watermark before the synchronisation pattern or to leave a space between the synchronisation pattern and the beginning of the watermark.

According to a particular embodiment, the packets are numbered. This may be useful if the packets are not displayed immediately by the receiver as soon as they are received, but are rather stored before being displayed. In this case, the packets can be received in non consecutive order, i.e. in an order which does not correspond to packets that are consecutive when displayed. In this case, there is no need for a synchronization pattern as the number of the packets plays the role of a header. In such a case, the watermark is formed of a succession of values associated with packets identified by specific numbers.

It should be noted that the watermark can be formed by non-consecutive packets or even by packets in any order. For example, the watermark can be formed by the value associated with the packet number 8, followed by the value associated with packet number 12, followed by the value associated with packet number 3 and so on.

In this embodiment, it is possible to retrieve the watermark even if the packets are sent, stored or displayed in an order which is not the normal forward order. This also enables retrieving the watermark in case of trick modes for example.

In the embodiment of FIG. 1b, each packet is associated with the value 0 or 1. The management center or the data provider stores data packets encrypted or encoded according to each quality. Thus, the provider stores a first packet with a first quality and the same packet with a second quality.

When a watermark or a pattern begins with a first value equal to zero, or in other words, when a first value, for example 0, must be transmitted to a given user unit, the provider sends the packet having a quality corresponding to the value 0, i.e. the packet having the first quality. If, as in the examples, the second value of the watermark is 1, the provider sends a second packet, corresponding to the following set of data, with the second quality, i.e. the quality corresponding to the value 1. For each value of the watermark, the provider sends the packet having the corresponding quality. The mapping between the quality and the corresponding value follows a rule that can be chosen depending on the specific implementation of the method of the invention, but which must be known for watermarking a content and for detecting a watermark from a content. Thanks to this rule, it is not necessary to compare the original content with the watermarked content for determining the watermark.

It should be noted that, in conventional systems, the content is usually not stored only once in a single server, but several times on a content delivery network (CDN). The content could be stored in the form of packets, having possibly several qualities for a same content. This could in particular be done for adaptive streaming. In these systems, the user unit requests a specific packet to the content provider or the content delivery network. The CDN or the provider sends the packet to the concerned user unit. The provider or the CDN have no capacities for choosing between several packets; they only have the capacity of sending a packet corresponding to the request. In the present invention, two different embodiments may be used. According to a first embodiment and contrary to the conventional systems described above, the provider or CDN has means for selecting a given packet among a set of packets.

When a specific user unit requires a given packet, this user unit sends a corresponding request to the selection means, together with credentials and identification means. The selection means verifies the credentials and determines from the identification means, which values should be associated with the packets to be sent. The selection means forms a request corresponding to the requested values and transmits the request to the provider or CDN. The provider then replies by sending the corresponding packet.

Figure 5:
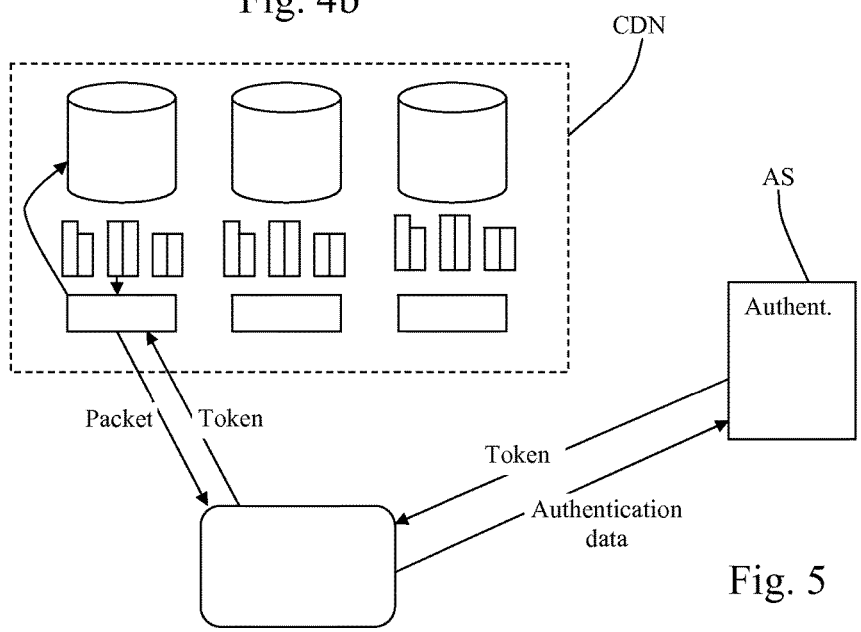
FIG. 5 illustrates a concrete implementation of the method of the invention, according to a particular embodiment.

According to a second embodiment, illustrated by FIG. 5, the selection is not made by the provider or CDN, but by an authentication server. Thus, a conventional provider or CDN can be used.

According to this embodiment, the user unit first sends a request to the authentication server AS which may be independent from the provider.

The request contains means for authenticating the user unit. If the authentication succeeds, the authentication server determines the user unit identifier and generates a token corresponding to said user unit identifier. This token is sent to the concerned user unit, usually in encrypted form.

Once the user unit has the token, it is sent to the provider. This provider checks if the token is valid. If this is the case, the provider sends the packets to the user unit. The content of the token defines which packets must be sent to the user unit. As the token depends on the user unit identifier, the packets sent to the user unit also depend on this identifier.

In this embodiment, the provider does not require means for selecting the packets to be sent. The provider simply sends the requested packets according to the value of the token.

In the embodiment of FIG. 2b, one value can be associated with more than one quality, i.e. for example two different qualities. The value 0 can be associated with a first quality, corresponding for example to a bit rate of 480 kb/s and with a second quality, corresponding for example to a bit rate of 680 kb/s. The value 1 can be associated with a first quality, for example 500 kb/s and with a second quality, for example 700 kb/s. In a preferred embodiment, the high quality associated with the value 0 is higher than the low quality associated with the value 1.

According to this embodiment, it is possible to take into account, the bandwidth and CPU capacities of the user units to which the packets must be sent. For a user unit having always a high capacity bandwidth, it is possible to use the packets having the best quality or resolution. Conversely, for a user unit having a low bandwidth capacity, the identifier can be sent by using the poor or lower quality packets. According to this embodiment, it is also possible to choose the type of packets to be sent dynamically, by taking into account the available bandwidth at a given time. This corresponds to adaptive streaming.

In this case, as it can be seen from FIG. 2b, the same value does not always use packets having the same quality since one value can be sent by using one of two different packet qualities. This also applies to the synchronisation pattern.

As in the embodiment described with reference to FIG. 1b, along with the synchronisation pattern, the watermark can be sent once per content, several times per content or all the packets could be used to indicate values forming the watermark. In the cases where not all packets are used to convey the watermark, conventional adaptive streaming can be used for these packets conveying no watermark. In the case that the watermark is sent during the whole event or a substantial part of the event, a "sort" of adaptive streaming can also be used.

If the available bandwidth is high, the high quality packet can be used to represent the values of the watermark. Conversely, if the available bandwidth is low, the low quality packet can be used to represent the values of the watermark.

Figure 3A:
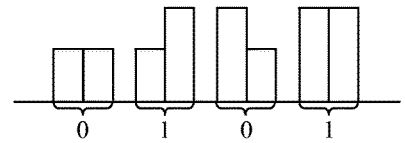
FIG. 3a is a schematic illustration of a third embodiment of the method of the invention.
Figure 3B:
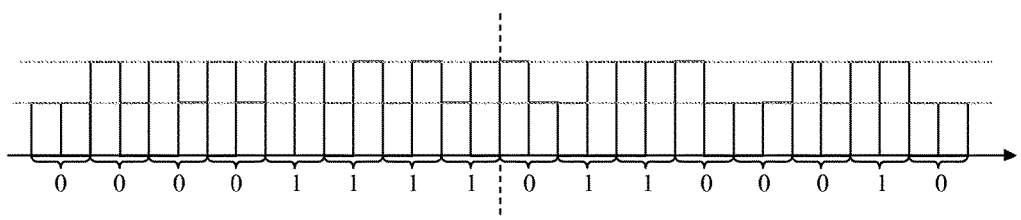

In the embodiment illustrated by FIGS. 3a and 3b, each value is not associated with one packet, but with two packets. More specifically, a data packet can have one of the two available qualities, for example low quality or high quality. Two consecutive packets must be used to define a value. In the example of FIG. 3, the value 0 is associated with two consecutive low quality packets or with a high quality packet followed by a low quality packet. The value 1 is associated with either a low quality packet followed by a high quality packet or with two consecutive high quality packets. It should be noted that the choice of associating one value with a kind of packets is completely arbitrary. It should also be noted that one value could be given not by two consecutive packets as in the example of FIG. 3, but by three or more packets.

The left hand part of FIG. 3b illustrates the synchronisation pattern {0;0;0;0;1;1;1;1}. As it can be seen from this Figure, the same value (for example 0) can be sent in two different ways; either two consecutive low quality packets or a high quality packet followed by a low quality packet. The same applies for sending the value 1. The choice of using one combination of packets rather than the other available one can be arbitrary or random. It can also take into account, the available bandwidth. If the available bandwidth is important, zeros can be transmitted by using the type containing a high quality packet. On the contrary, if the available bandwidth is low, zeros would be sent by using only low quality packets. For transmitting the value 1, in case of high bandwidth, the type containing only high quality packets can be used. In case of low bandwidth, the value 1 can be sent by using one low quality packet followed by a high quality packet.

As previously, the identifier can be repeated cyclically or spread among the data packets. In case the watermark does not fill the whole content, conventional adaptive streaming can be used. Partial adaptive streaming can be used even if the watermark is sent during the whole content.

Figure 4A:
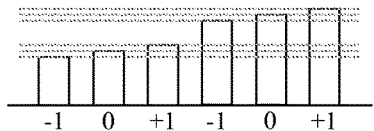
FIG. 4a represents a further embodiment of the method of the invention.

FIG. 4 concerns an embodiment in which the watermark is not formed of two values, but three, for example −1, 0 and +1. Moreover, in this example, each value corresponds to two different qualities. Thus, at least a part of the packets used to send an identifier are encoded according to six different qualities corresponding to low or high quality for each of the values −1, 0 and +1.

Figure 4B:
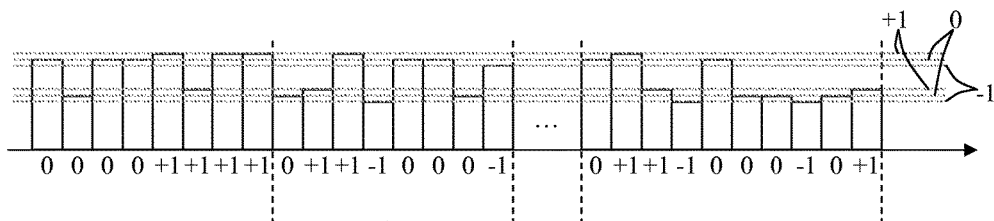

In FIG. 4b, the left part shows the synchronisation pattern {0;0;0;0;1;1;1;1}. Zeros, minus one and plus one can be sent according to two different qualities. The qualities for a given packet can be random, can be chosen arbitrarily or can depend on the available bandwidth.

Figure 6A:
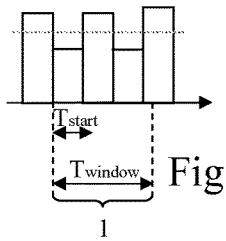
FIG. 6a illustrates a first value associated with a set of packets, according to a variant of the method of the invention.
Figure 6B:
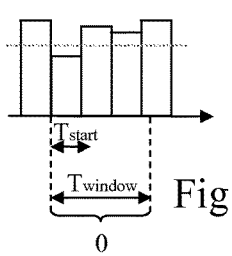
Figure 6C:
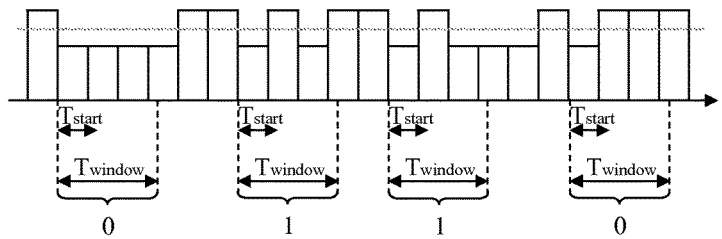
FIG. 6c illustrates a set of packets corresponding to a watermark, according to the embodiment of FIGS. 6a and 6b.

FIGS. 6a, 6b and 6c concern an embodiment which is particularly adapted to the case where it may be difficult to guarantee a good synchronization between the signal to be detected and the sampling. Desynchronization can lead to misdetection of the watermark, such desynchronization being likely to arise when a long series of values are sent without intermediate resynchronization.

In order to avoid such desynchronization, this embodiment uses the fact that the packets are available in two different qualities. As in the other embodiments, a specific succession of packets is associated with the value 0 and another succession of packets is associated with the value 1.

In this embodiment, the pattern used to detect an element of the watermark is not a static element, but derives from the dynamic behavior of the packets.

More specifically, the succession of a high quality packet followed by a low quality packet opens a time window. The succession of qualities of the packets during this time window corresponds to the value that is sent. For example, if during the time window, a succession of a high quality packets, followed by a low quality packet arises, the associated value is considered as being 0. On the contrary, if there is no "drop" of quality during the time window, the associated value is 1.

FIG. 6a illustrates an example of a group of packets comprising a start pattern, followed by other packets demonstrating a drop of quality during the time window. This feature corresponds to the value 0.

FIG. 6b is similar to FIG. 6a except that there is no drop of quality during the time window. This feature corresponds to the value 1.

FIG. 6c illustrates the transmission of a watermark having the value 0110. This embodiment is self-synchronized at the beginning of each value transmission period. This avoids cumulative jitter which may arise when a long series of values must be sent without intermediate synchronization.

When a content is received or detected and when a watermark must be retrieved from this content, the quality of each packet is determined. This determination may be done by reading a relevant piece of information which is contained within the packet. According to another embodiment, the determination of the quality can also be done by analyzing the content of the packet itself and by calculating the quality according to the result of this analysis.

In a first example, it is assumed that the watermark has been set according to the embodiment of FIG. 1b. According to this embodiment, the quality of each packet is determined.

If this quality is low, i.e. it corresponds for example to a high compression rate, the value is considered as being 0. If the quality corresponds to a high quality, i.e. a low compression rate, the value associated to this packet is 1. This determination is made for each packet. In order to detect the watermark, the series of values is determined. If a given series of values correspond to a synchronization pattern, the watermark is formed by the values indicated by a given rule, known from the entity in charge of the watermarking and the entity in charge of retrieving the watermarking. An example of such a rule is using the n packets following the synchronization pattern to form the watermark.

Figure 2A:
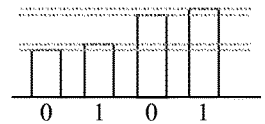
FIG. 2a represents a second embodiment of values associated with packets having different qualities.
Figure 2B:
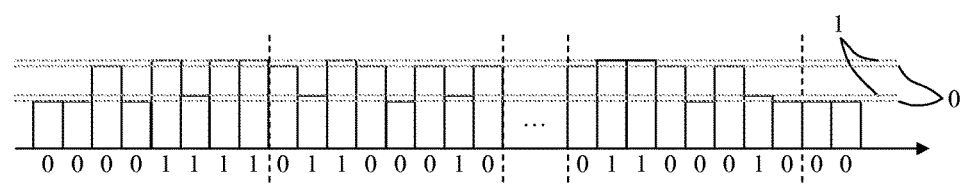

If the watermark uses the embodiment of FIG. 2, the determination of the quality of a packet is made as for the embodiment of FIG. 1. However, in this case, four qualities can be found. Two qualities correspond to the value 0 and two other qualities correspond to the value 1.

In the embodiment of FIG. 3, the quality of the packets is also determined. However, one value is obtained by using two packets.

In the embodiment of FIG. 6, the quality of each packet is determined. If a drop of quality, i.e. the transition from a high quality packet to a low quality packet is detected, a time window opens. In this context, a drop of quality means the transition from a quality above a given threshold to a quality below a threshold, which can be the same or another one.

The quality of the packets during this time window is measured. If there is a drop of quality during this time window, the value associated to this group of packets is considered as being 1. If there is no drop of quality during this time window, the value of the group of packets is considered as being 0. In this case, the synchronization pattern corresponds to a quality drop. If there is no quality drop outside of the time window, the qualities of the packets are not used for determining the watermark.

Several combinations of the different embodiments as well as several adaptations of these embodiments are possible. For example, it is possible to use three or more values to define a watermark. The use of these three or more values can be made in the case where one value is associated with one quality or in case one value is associated with several qualities.

It is possible to have one value, for example 0, associated with two or more qualities and to have another value, for example 1, associated to another number of qualities, for example only one.

In the embodiment of FIG. 3a or b, two packets are used two define one value. It is possible to use more than two packets to define one value. Furthermore, in the embodiment of FIG. 3, the packets can correspond to two different resolutions or qualities, for example low and high quality. It is possible to define more than two resolutions or qualities for each packet.

If different possibilities are available for sending the same value, the choice of the used possibility may be arbitrary, may be decided randomly or may depend on the available bandwidth.

The watermark may be sent during the whole transmission of the content. It could be sent several times during the transmission of the content, without these "several times" covering the whole content, or it can be sent only once. If the watermark is not sent during the whole content, it can be sent at given times during the transmission or randomly, in order to prevent a user from being able to determine when the watermark is sent or if a watermark is sent.

When the watermark is not sent, the transmission of the packets can be made always with the same quality, or if available, with different qualities. In this case, the resolution or quality can be random or arbitrary or depending on the available bandwidth.

At the provider's side, if a packet is used to transmit a watermark, this packet must be encoded according to the watermark to be transmitted. This means that at least two versions of the same packet must be available by the provider. For the packets that are not used to transmit a watermark, it is possible to have only one version of each packet.

However, it is also possible to have several versions. This can be interesting for using the adaptive streaming as well as for hiding the watermark within the content. An ill-intentioned person will have difficulties in determining that a watermark is hidden among the packets and it will also be difficult to determine where it is hidden.

It is also possible to determine a watermark not by consecutive packets, but by packets at given locations within the content. Thus, the watermark will be even more difficult to detect by a non authorized person.

Thus, this invention provides an effective method for watermarking a content for unicast transmission.

The invention claimed is:

1. A method for detecting a watermark of a watermarked content comprising a first series of packets, a portion of the packets from the first series of packets having different resolutions or compression rates from other packets in the first series of packets, the method of comprising:
    determining, by a device receiving a redistributed copy of the watermarked content, a resolution or compression rate in at least some packets from the first series of packets of the redistributed copy of the watermarked content;
    associating, by the device, a value to each of the at least some packets of the redistributed copy of the watermarked content, said value being associated based on the resolution or compression rate of the watermarked content in the respective packet;
    calculating, by the device, the watermark from the values associated to the at least some packets of the redistributed copy of the watermarked content; and
    uniquely identifying, from the watermark, a user unit to which the watermarked content was sent prior to redistribution.

2. The method according to claim 1, wherein different possible resolution or compression rates for the content of for a packet are associated with at least two different values.

3. The method according to claim 2, wherein each different resolution or compression rate of the content of a packet is associated with a different value.

4. The method according to claim 2, wherein several different resolutions or compression rates possible for a packet are associated with a same value.

5. The method according to claim 2, wherein a value from the series of values forming the watermark is associated with the resolutions or compression rates of the watermarked content of a single packet.

6. The method according to claim 2, wherein a value from the series of values forming the watermark is associated with the resolution or compression rate of the watermarked content of at least two consecutive packets.

7. The method according to claim 1, wherein the watermarked content further comprises a synchronization pattern, the synchronization pattern comprising a second series of values associated with a second series of packets.

8. The method according to claim 1, wherein the packets comprise a packet identification number.

9. The method according to claim 1, wherein the resolution or compression rate of a packet transmitted to the user unit and corresponding to a value of the watermark further depends on a bandwidth available between the content provider and said user unit.

10. A method for embedding a watermark in content to be sent to at least one user unit having a user unit identifier, the content comprising a first series of packets, some of the packets in the first series of packets being available in at least two different resolutions or compression rates, said method comprising:
generating, by a data provider device, the watermark based on at least the user unit identifier, the watermark being formed by a first series of values from a predetermined set of values, the watermark uniquely identifying the user unit to a device receiving a redistributed copy of the watermarked content originating at the user unit;
mapping, by the data provider device, each of the at least two different resolutions or compression rates to one of the values from the predetermined set of values;
sequentially selecting, by the data provider device, from each packet in the first series of packets available in at least two different resolutions or compression rates, a packet having a resolution or compression rate mapped to a corresponding value from the first series of values forming the watermark; and
transmitting, by the data provider device, the packets to the at least one user unit according to a sequence of the selecting, wherein the sequence corresponds to the watermark.

11. The method according to claim 10, wherein the different resolutions or compression rates available for a packet are associated with at least two different values from said predetermined set of values.

12. The method according to claim 11, wherein each different resolution or compression rate of a packet is associated with a different value from said predetermined set of values.

13. The method according to claim 11, wherein several different resolutions or compression rates available for a packet are associated with a same value from said predetermined set of values.

14. The method according to claim 11, wherein a value from the series of values forming the watermark is associated with the resolutions or compression rates of a single packet.

15. The method according to claim 11, wherein a value from the series of values forming the watermark is associated with the resolution or compression rate of at least two consecutive packets.

16. The method according to claim 10, wherein the watermarked content further comprises a synchronization pattern, the synchronization pattern comprising a second series of values associated with a second series of packets.

17. The method according to claim 10, wherein the packets comprise a packet identification number.

18. The method according to claim 10, wherein the resolution or compression rate of a packet transmitted to the user unit and corresponding to a value of the watermark further depends on a bandwidth available between the content provider and said user unit.

19. The method according to claim 10, wherein said server computer:
determines the bandwidth available between the content provider and said user unit;
determines a subset of packets according to the available bandwidth and the values forming the watermark to be transmitted; and
chooses among the packets of said subset of packets, at least one packet having a resolution or compression rate corresponding to the value to be transmitted among the series of values forming the watermark.

20. The method according to claim 10, wherein said server computer determines at least one resolution or compression rate of the packets corresponding to said watermark and sends a request to the content provider requiring the transmission of the corresponding packet to the concerned user unit.

21. A server computer for building a watermark for content to be sent to at least one user unit having a user unit identifier, the server computer comprising:
a processing circuit; and
an interface connected to the processing circuit;
wherein the processing circuit is configured to
generate the watermark based on at least the user unit identifier, the watermark being formed by a first series of values from a predetermined set of values, the watermark uniquely identifying the user unit to a device receiving a redistributed copy of the watermarked content originating at the user unit;
map each of at least two different resolutions or compression rates to one of the values from the predetermined set of values, the at least two different resolutions or compression rates being resolutions or compression rates at which a first series of packets included in the content are available;
sequentially select, from each packet in the first series of packets available in at least two different resolutions or compression rates, a packet having a resolution or compression rate mapped to a corresponding value from the first series of values forming the watermark; and
transmit the packets to the at least one user unit according to a sequence of the selecting, wherein the sequence corresponds to the watermark.

* * * * *